(12) United States Patent
Rajagopalan et al.

(10) Patent No.: US 9,617,171 B2
(45) Date of Patent: Apr. 11, 2017

(54) BIOCIDAL PURIFICATION REACTOR

(71) Applicant: Merck Patent GmbH, Darmstadt (DE)

(72) Inventors: Pascal Rajagopalan, Palaiseau (FR);
Julien Gross, Elancourt (FR); Ichiro Kano, Montigny le Bretonneux (FR);
Yves Gaignet, Montigny le Bretonneux (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/889,608

(22) PCT Filed: Apr. 24, 2014

(86) PCT No.: PCT/EP2014/001095
§ 371 (c)(1),
(2) Date: Nov. 6, 2015

(87) PCT Pub. No.: WO2014/187523
PCT Pub. Date: Nov. 27, 2014

(65) Prior Publication Data
US 2016/0083272 A1    Mar. 24, 2016

(30) Foreign Application Priority Data
May 22, 2013  (EP) .................................... 13290113

(51) Int. Cl.
*C02F 1/32*    (2006.01)

(52) U.S. Cl.
CPC ...... *C02F 1/325* (2013.01); *C02F 2201/3222* (2013.01); *C02F 2201/3227* (2013.01); *C02F 2201/3228* (2013.01); *C02F 2303/04* (2013.01)

(58) Field of Classification Search
CPC .............. C02F 1/325; C02F 2201/3222; C02F 2201/3227; C02F 2201/3228; C02F 2303/04
USPC .......... 250/432 R, 435, 436, 453.11, 454.11, 250/455.11, 493.1, 504 R; 422/22, 24
See application file for complete search history.

(56) References Cited

U.S. PATENT DOCUMENTS

2010/0237254 A1    9/2010  Mason et al.
2012/0051977 A1*   3/2012  Boodaghians .......... C02F 1/325
                                                        422/117
2012/0138545 A1    6/2012  Soler et al.

FOREIGN PATENT DOCUMENTS

WO    2006/068979 A1    6/2006
WO    2006/134567 A1   12/2006
WO    2009/013507 A1    1/2009

OTHER PUBLICATIONS

International Search Report mailed Jun. 12, 2014 in corresponding PCT application No. PCT/EP2014/001095.

* cited by examiner

*Primary Examiner* — Nicole Ippolito
(74) *Attorney, Agent, or Firm* — Nields, Lemack & Frame, LLC

(57) ABSTRACT

A biocidal purification reactor, including a main cylinder tube (1A;1B), at least one end cap (2A,2B,2C) closing at least one axial end opening of the main cylinder tube (1A;1B), at least two ports (3A,3B) communicating with the interior volume (4) of the main cylinder tube (1A;1B) in the vicinity of the respective axial ends of the cylinder tube (1A;1B), and at least one of said end caps (2A) or said main cylinder tube (1B) including a UV-light source (7A;7B).

25 Claims, 4 Drawing Sheets

BIOCIDAL PURIFICATION REACTOR

Figure 1:
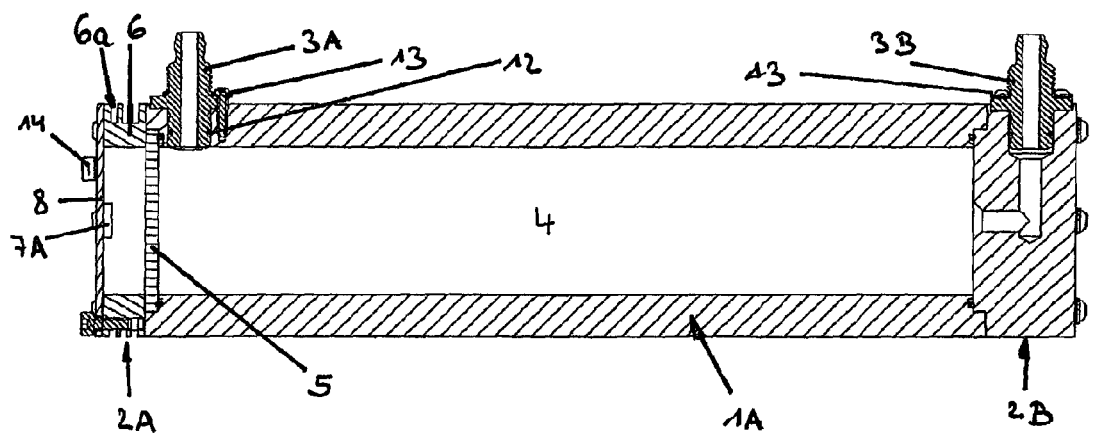

The present invention concerns inline flow-through devices for biocidal laboratory water purification applications based on UV-light sources and for other applications in chemistry (including analytical applications) and pharmaceutical applications. In this connection the invention is specifically directed to a biocidal purification reactor which is a self-supporting apparatus or unit that can be used in setting up laboratory water purification applications.

Purified water is used in laboratory environments for various purposes, i.e. for cell culture or for use in molecular biology, biochemistry or microbiology applications, but is also used in other fields like the medical or health care fields.

Biocidal purification reactors for such a purpose are known in the field but currently mainly use mercury UV lamps as the light source because of their low cost and simplicity of use. A problem of all mercury based light sources is the fact that mercury is a toxic element so that the fabrication, transport, use and recycling of such light sources is subject to strict safety regulations. WO 2006-068979 A1 discloses a water purification reactor including a jacket that is connected at each axial end to a manifold and is capable of receiving water from an inlet where the water enters a first axial manifold so that it can pass through the jacket around the outside of a centrally located UV light source and can exit through an outlet via a second axial manifold.

The manifolds and the jacket are made of transparent material such as glass, plastic, composites and other types of transparent material. As the water flows through the jacket the light from the centrally located UV light source irradiates the water for disinfecting purposes. The jacket is enclosed by material to prevent the UV radiation harmful to the human eye from leaving the jacket. The document suggests a stainless steel to prevent the UV light from leaving the reactor.

US 2010-0237254 A1 discloses a fluid treatment apparatus for at least partially disinfecting water in aquatic environments such as aquariums, fish ponds or the like. The treatment apparatus comprises a cylindrical pipe with a fluid retaining wall and made from plastics material which is said to be resistant to degradation under the effects of UV radiation and is also preferably UV reflective. A plurality of UV light sources in the form of individual LEDs are arranged at spaced longitudinal positions along the pipe and attached to the wall of the pipe such that the light emitting portion of each LED extends radially into the pipe through an associated aperture in the wall. The light range of the LEDs is between 263 nm and 275 nm and preferably in the order of 265 nm. The diameter of the cylindrical pipe is proposed to be in the range of 20 mm for the aquatic applications. The pipe is configured at the axial inlet and outlet ends of the tube for onward connections to a source of water, an aquatic filter or onward tubing.

Although LEDs emitting light or UV radiation in the wavelength range of "short waves" or UV-C that is known for its germicidal effectiveness due to the capability to destroy the nucleic acid in microorganisms have thus been proposed as light sources in such reactors for water purification, the currently described concepts are not fit to practice because they suffer from inadequate efficiency and do not consider thermal aspects. In this connection the negative influence of heat on the LEDs must be considered because excessive heating of the LEDs will decrease light output instantaneously and a shift of the wavelength in the direction towards the visible spectrum and, in a longer term, will considerably decrease the useful lifetime of the LEDs. Furthermore, the design that employs LEDs in direct contact with the water to be treated releases considerable heat into the water which promotes the growth of microorganisms.

It is an object of the present invention to provide a solution for the above identified problems and to provide an improved biocidal purification reactor that is practically useful as an inline flow-through device in biocidal laboratory water purification applications. The present invention teaches a biocidal purification reactor as defined in claim 1. Preferred embodiments of the reactor are defined in the dependent claims.

The biocidal purification reactor of the invention thus includes a main cylinder tube, at least one end cap closing at least one axial end opening of the main cylinder tube, at least two ports communicating with the interior volume of the main cylinder tube in the vicinity of the respective axial ends of the cylinder tube, and at least one of said end caps or said main cylinder tube including a UV-light source.

In a preferred embodiment the biocidal purification reactor includes a pair of end caps respectively closing the opposite axial end openings of the main cylinder tube.

In that the UV light source is integrated into one or both of the end caps and/or the main cylinder tube, through which interior volume the fluid to be processed in the reactor flows via the ports communicating therewith, the heat released from the UV light source(s) can be effectively dissipated to the environment while avoiding extensive heating of the LED light source and of the fluid to be processed.

In a preferred embodiment the UV-light source(s) is/are separated from the interior volume of the main cylinder tube and from the fluid to be processed by an UV-transparent material, preferably in the form of a window or cylinder that is preferably made from quartz or silica glass. Shielding the UV light source(s) from the fluid further improves the heat dissipation to the environment and away from the fluid to be processed. The heat dissipation can be still further increased in that the UV-light source is thermally conductively connected to a heat sink adapted to dissipate the heat from the UV-light source to the environment. A preferred structure according to the invention is a heat sink in the form of a ring segment with surface area increasing features like fins, ribs, folds or other protrusions provided at the periphery. Such ring segment can be provided in the end cap on the side of the UV transparent window facing away from the interior volume of the main cylinder and, for example, between the light source and the UV transparent window.

In a preferred embodiment the UV light source is formed by one or more LED(s) adapted to emit light in the UV-C wavelength range of 220 nm-300 nm, preferably of 260 nm+/−5 nm, wherein the LEDs are mounted on a PCB including a metal base. The metal base of the PCB facilitates heat conduction away from the typically surface-mounted and packaged LED(s). If such a PCB is connected to the heat sink, i.e. in the form of a ring segment with the surface area increasing features, the efficiency of the heat dissipation away from the LED(s) to the environment is improved and the amount of heat transferred to the fluid is reduced at the same time. Suitable UV LEDs are commercially available, e.g. from Seoul Optodevice, reference number CUD8AF1A.

The use of end caps into which the UV-light source is integrated allows for a modular structure that provides a flexible design for maintenance and capacity changes in that main cylinder tubes of different length but essentially identical structure at the end portions are selectively used with identical end caps that either include the UV-light source or not. Thus, different types of reactors in terms of capacity can be easily designed. Also, reactor types can be set up having a UV-light source in only one of the end caps or in both end caps.

The end cap(s) can be at least partially made from a material that reflects UV-radiation, preferably aluminium or PTFE or stainless steel, preferably at those portions that are exposed to the radiation from the UV-light source. This feature provides increased effectiveness for end caps that include the UV-light source but also for the end caps that do not include the UV-light source because the UV-radiation is effectively reflected towards the interior volume of the main cylinder tube either directly from the light source or after the UV-radiation has been repeatedly reflected at the inner peripheral wall of the main cylinder tube. The UV-reflecting material at the end caps reflects back the UV-radiation into the main cylinder tube, thereby efficiently exploiting the available UV-radiation even if only a small number of LEDs including one is used, which in return itself reduces the amount of heat produced by the LED(s).

The reflecting properties of the end caps can be further increased in that a portion of the end cap(s) is formed as a reflector, parabolic or circular or combinations thereof, for directing the light rays emitted from the UV-light source at that end cap or arriving there after multiple reflections along the main cylinder towards the interior volume of the main cylinder tube.

For the purpose of increasing the reflections of the UV-radiation along the main cylinder tube at least a part of the inner peripheral surface of the main cylinder tube can be formed with the UV-reflecting material, preferably PTFE or aluminium or stainless steel.

This UV-reflecting material can be provided as a lining or sheet overlaying the respective surface of a supporting tube main body or as a coating applied on the respective surface of a supporting tube body. In this case the main body can be made from a different material not having the UV-reflecting properties itself. The coating can be applied in known technologies like sputtering. Of course, the supporting tube body can be itself made from a solid UV-reflecting material like stainless steel or PTFE or aluminium. If, however, the material of the main cylinder tube should be prevented from contact with the fluid to be processed in the reactor, at least parts of the inner peripheral surfaces can be covered by a UV-transparent separation layer, preferably quartz or silica glass. This allows, for example, the use of aluminium that would otherwise be subject to corrosion.

As an alternative to the reactor design having the UV-light source in one or both axial end caps, the LEDs serving as the light source can be provided in one or more arrays along the length of the main cylinder tube.

A particularly advantageous structure in terms of radiation utilization efficiency and heat dissipation is a structure where the one or more arrays of LEDs are located in corresponding openings or recesses of a cylindrical shell made of UV-reflective material that forms an element of the main cylinder tube. Here, too, a UV-transparent separation layer, preferably in the form of quartz or silica glass cylinder can be used to shield the cylindrical shell made of UV-reflective material from contact with the fluid to be processed.

The biocidal purification reactor can be placed at the last step of a water purification system (comprising reverse osmosis and electrodeionisation purification stages) and upstream to the storage tank. Thus the biocidal purification reactor can be located at the bottom of a storage tank in the vicinity of the tank inlet.

While the two ports communicating with the interior volume of the main cylinder tube and located in the vicinity of the respective axial ends of the cylinder tube provide efficient flow for the fluid through the reactor and its interior volume, a third or central port communicating with the interior volume of the main cylinder can be provided between the at least two other ports in the vicinity of the axial ends. With such a structure the biocidal purification reactor can be used as a UV-barrier module in a laboratory or industrial flow configuration.

Figure 2:
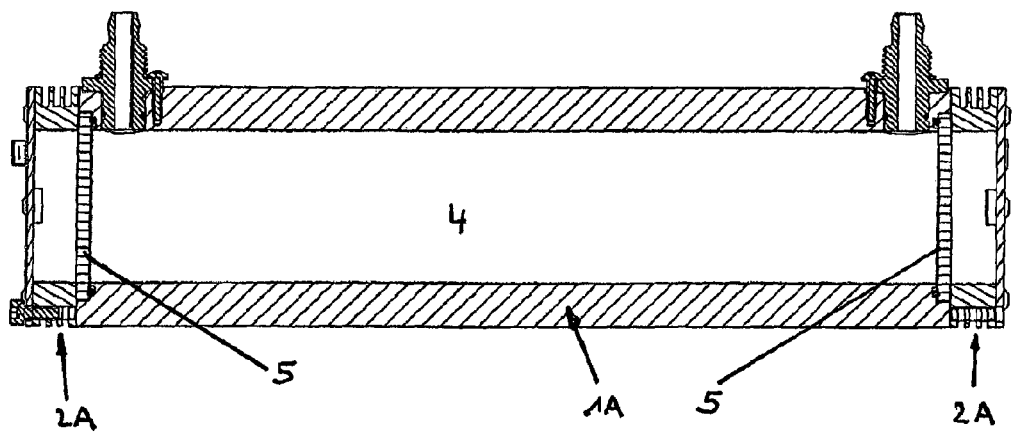
Figure 3:
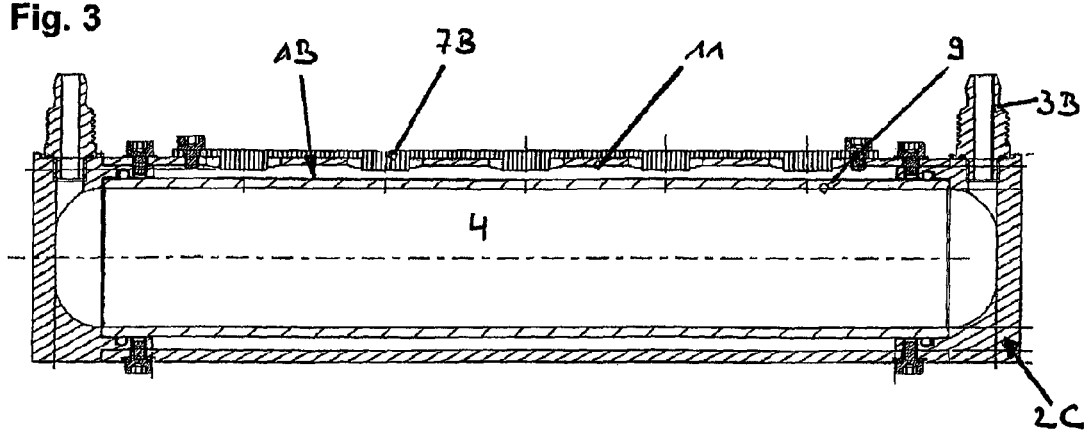
Figure 4A:
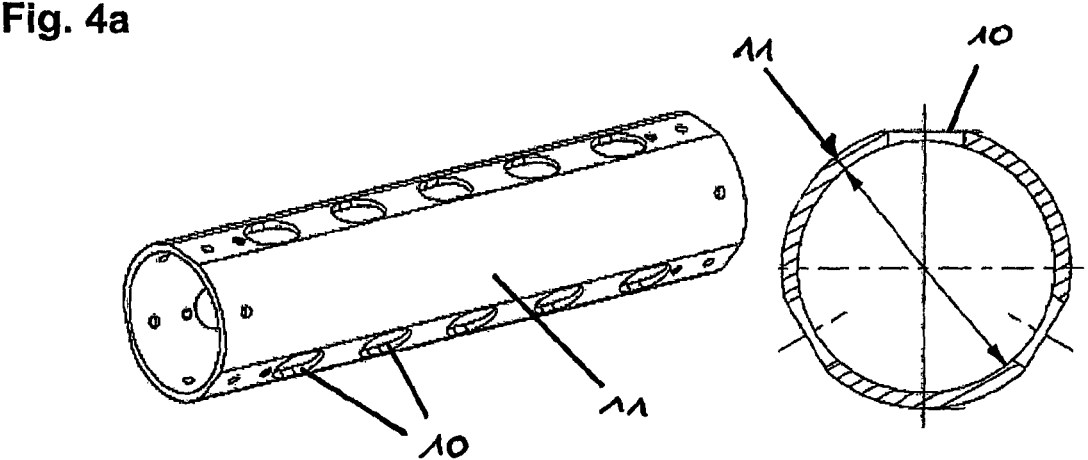
Figure 4B:
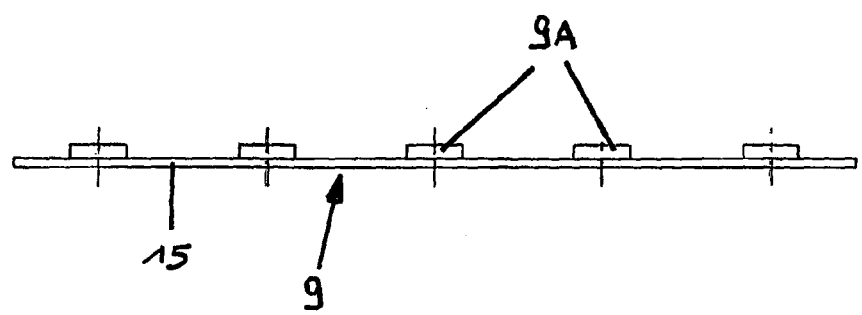
Figure 4C:
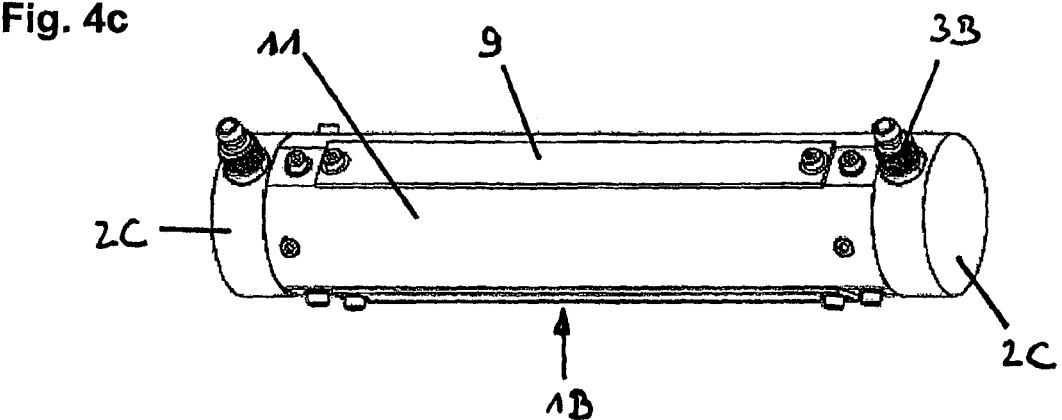
Figure 5:
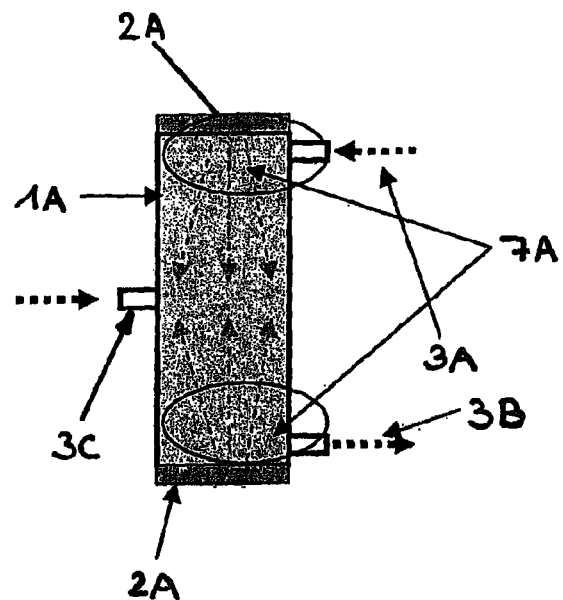
Figure 6A:
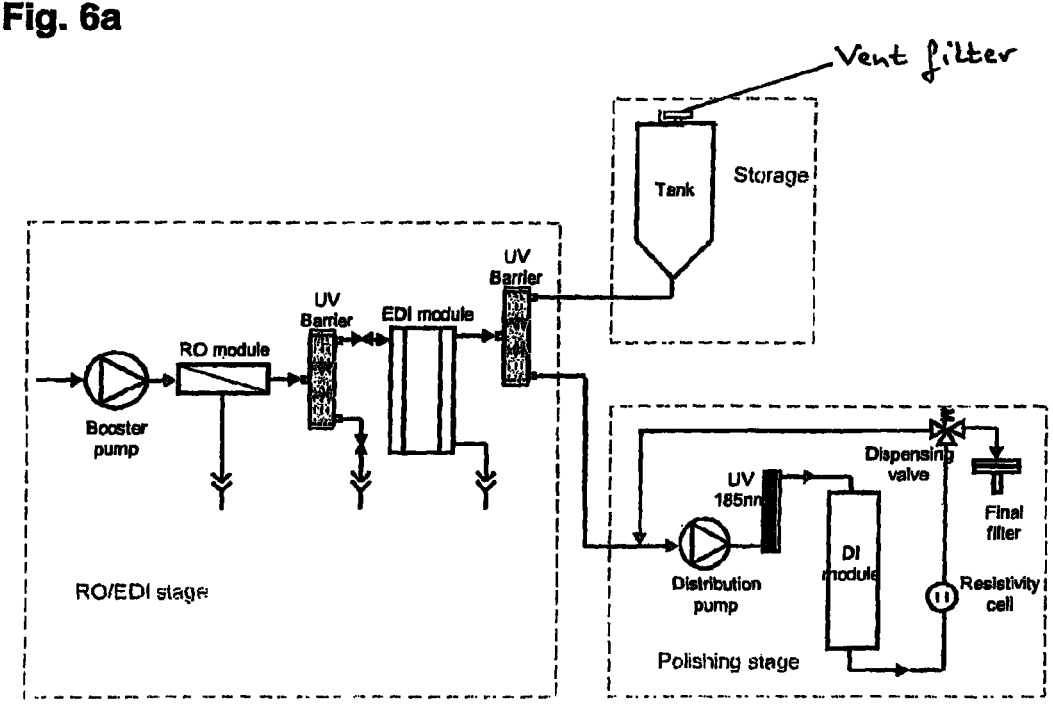
Figure 6B:
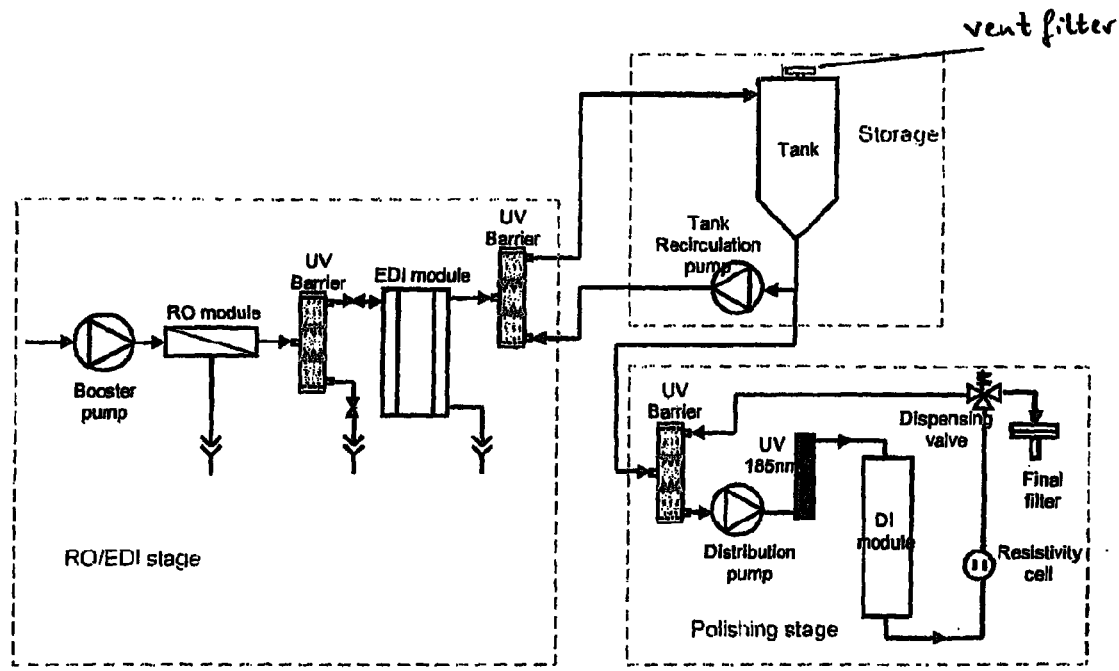
Figure 6C:
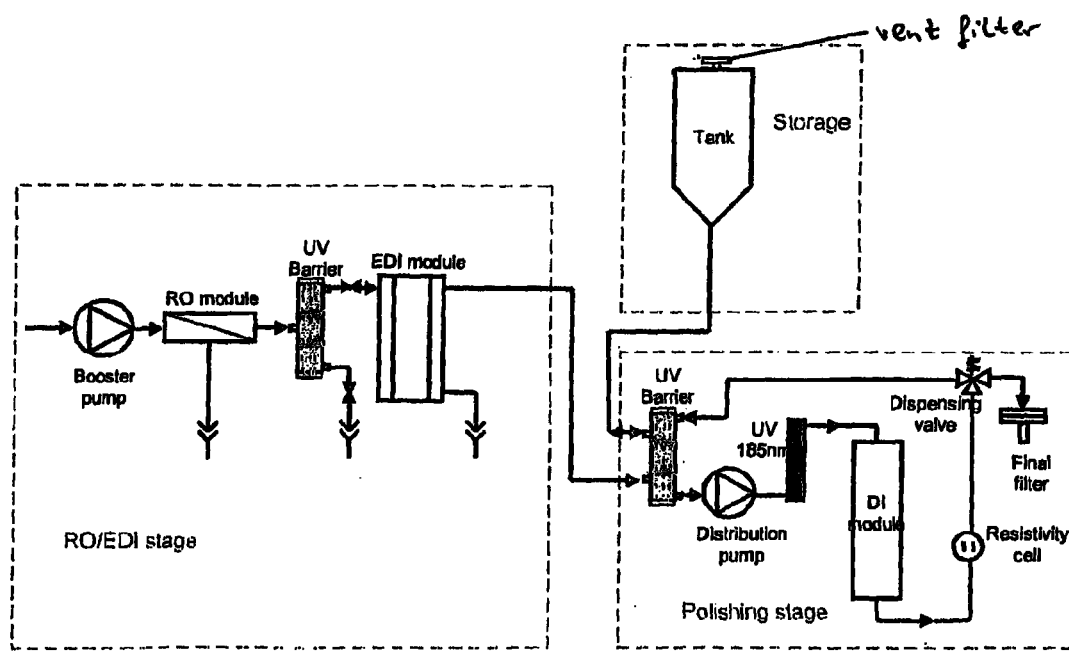

The invention will now be described on the basis of three basic embodiments of the biocidal purification reactor of the invention by reference to the attached drawing in which:

FIG. 1 shows a cross sectional view of a first embodiment of the purification reactor having the UV-light source at one axial end cap, FIG. 2 shows a cross sectional view of another embodiment of a purification reactor having UV-light sources at both axial end caps, FIG. 3 shows a cross sectional view of a third embodiment of the purification reactor having the UV-light source integrated into the main cylinder tube, FIG. 4a shows a cross sectional view and a perspective view of the cylindrical shell made of UV-reflective material used in the third embodiment of the reactor, FIG. 4b shows the detail of the LED array mounted to the openings of the shell in the third embodiment, and FIG. 4c shows a perspective view of the reactor with the mounted LED arrays, FIG. 5 shows a schematic representation of a modification of the purification reactor to be useful as an UV-barrier module, and FIG. 6a to c show different examples of the use of a purification reactor of the invention as UV-barrier module.

A first embodiment of the invention which could be identified as an end-cap purification reactor in general and more specific as a "single end-cap reactor" is shown in FIG. 1. In this type of reactor the UV-light source 7A is integrated in only one of the axial end caps 2A, 2B attached to the opposite axial ends of a main cylinder tube 1A so as to close the opposite axial end openings thereof. The end cap 2A including the UV-light source 7A is separated from the interior volume 4 of the main cylinder tube 1A by an UV-transparent material in the form of a window 5 preferably made from quartz or silica glass. The end cap 2A further comprises a heat sink in the form of a ring segment 6 that has, at its outer periphery, surface area increasing features like fins 6a that promote the conduction and natural convection with the ambient air. At the ring segment 6 a PCB 8, preferably one including a metal base for improved heat transport, is attached so as to be in thermally conductive connection with the ring segment 6 that serves as the heat sink. The PCB and its details will be described further below.

The ring segment can be attached to the axial end of the main cylinder tube by releasable mechanical attachment including a plurality of peripherally distributed screws or by releasable mechanical clamping mechanisms known in the art.

The other axial end is closed by an end cap 2B without an UV-light source. The mechanical attachment can be releasable and in the same configuration as for the other end cap 2A. This facilitates interchangeable use of the end caps and main cylinder tubes to create different structures of purification reactors. For example, plural main cylinder tubes of different length can be provided and used interchangeably with the same type of end caps to create purification reactors having different processing volume. For this purpose the interface between the end caps and the main cylinder tube is identical and symmetrical. Where, for example, an end cap without UV-light source is used, the receiving portion for the UV-transparent window is simply filled by a step of the end cap as shown in the right section of FIG. 1. To create the flow of the fluid to be processed through the interior volume of the main cylinder at least two ports 3A, 3B communicating with the interior volume are provided in the vicinity of the respective axial ends of the cylinder tube. As shown in FIG. 1 the ports can be in the form of standard fittings removably attached to openings in the peripheral wall of the main cylinder tube 1A and/or in the end caps 2B. Providing the ports in the peripheral wall of the cylinder tube provides the advantage that the end caps can be exchanged freely.

In the present example the fittings defining the ports are inserted into holes in the wall of the main cylinder tube and the end cap without the UV-light source and are sealed by way of an O-ring 12 and are attached by way of screws 13. Alternatively the fittings can be attached by way of a mating threaded connection between the fitting and the hole in the cylinder tube wall or end cap. Such a structure is shown in FIG. 2, for example. Press-insertion or any other known fastening or sealing methods can also be used.

The embodiment shown in FIG. 2 can be identified as "dual end-cap reactor" where both axial end caps 2A attached to the axial openings of the main cylinder tube 1A are provided with UV-light sources 7A. The end caps 2A in this case are preferably identical and can be the same as used in the embodiment of FIG. 1. Therefore, a detailed description of the end cap at the right side of the reactor shown in FIG. 2 is omitted.

The PCB ("printed circuit board") 8 mounted in the respective end cap 2A including the UV-light source 7A has, as mentioned above, preferably a metal substrate for enhanced heat dissipation to the environment by conduction via the end cap and the ring segment. The PCB 8 could also be made in a more conventional structure based on plastics material when dedicated heat conducting elements are provided to conduct the heat away from the heat producing elements on the PCB.

In addition to supporting one or more LED(s) the substrate may include a further LED emitting light in the visible light range to allow visual inspection and confirmation of the function of the reactor by a user. Further, a thermistor or thermal sensor can be integrated to allow sensing of the temperature on the PCB and supply this information to outside control circuitry or to use the information in internal circuitry to switch off or dim the operation of the LED(s) to help reducing the thermal level. The PCB may include the necessary electronic circuitry 14 to drive the LED(s). The circuitry may be provided with additional functions and control programs that allow stand-alone intermittent or program-controlled operation of the LED(s) of the reactor. A connector accessible from outside for exchanging data with external control devices can be provided integrated with or separately from a power supply connector for providing the necessary electrical energy to operate the UV-light source and the supporting circuitry on the PCB. Thus, the "intelligence" of the circuitry and functions implemented on the PCB can vary from a simple conduction pattern receiving all or substantially all instructions and signals from outside to circuitry including the LED driver, visible LED management, thermistors, failure detection and compensation circuits for the LEDs and management circuitry for the driving current that are activated by control instructions.

The control instructions for dimming the irradiation of the LEDs can be typically transmitted by way of a pulse width modulated signal. In the case of the "dual end-cap reactor" one of the end caps could even act as a "master" and the other as a "slave" to avoid redundant circuitry and functions.

If several LEDs or a LED with larger power are used, the ring segment can be exchanged against one having a higher heat dissipating capacity. This option is also part of the modular concept of the reactor of the present invention.

The end caps, i.e. the ring segments in the embodiments of FIGS. 1 and 2 and/or the end caps without UV-light source can be made at least partially from a material that reflects UV-rays, preferably aluminium or PTFE or stainless steel, preferably at those portions that are exposed to the radiation from the UV-light source. This increases the efficiency of the transfer of the UV-radiation to the interior volume of the main cylinder tube.

Those portions of the end caps that are exposed to UV radiation can be additionally formed as a reflector, i.e. parabolic or circular or combinations thereof, to direct the light rays emitted from the UV-light source(s) towards the interior volume of the main cylinder tube. Although not shown, such a parabolic or otherwise reflecting contour can be formed at the inner peripheral walls of the ring segment which, at their outer peripheral walls, serve as the heat radiator.

The main cylinder tube, too, can be formed with the UV-reflecting material like PTFE or aluminium or stainless steel. The main cylinder tube can be machined from the solid UV-reflecting material mentioned above or can be made in the form of a supporting tube body that is subsequently provided with a lining or sheet made from the UV-reflecting material and overlaying at least the inner surface of the tube body that would be exposed to UV-radiation. Alternatively, the UV-reflecting material can be applied as a coating to the surfaces of the supporting tube body, i.e. by sputtering or spraying or other methods known in the art.

If the main cylinder tube is made from a material that needs to be protected from contact with fluids to be processed, the relevant respective surfaces, i.e. the inner peripheral surface of the main cylinder tube can be covered by a UV-transparent separation layer, preferably quartz or silica glass. A simple configuration of this concept would be a quartz or silica glass cylinder inserted into the main cylinder tube and sealed with respect to the fluid to avoid ingress of fluid between the quartz glass tube and the outer main cylinder tube. The sealing can be also provided at the end caps to facilitate mounting/dismounting of the glass cylinder and the main cylinder tube. The UV-transparent material protects the material of the main cylinder tube but, at the same time, allows transmission of the UV-radiation and reflection at the material of the main cylinder tube.

The UV-reflecting properties of the inner peripheral wall of the main cylinder tube provide for multiple reflections of the UV-radiation and an effective distribution of radiation and treatment of the fluid in the internal volume. The PCB, too, can be completely or partially made from UV-reflecting material or can be covered or coated partially or completely with such a material. One possibility of covering is the use of a sheet of expanded PTFE, for example available from GORE™ in the thickness of 0.5 mm. Aluminium, too, can be alternatively used and applied by coating or sputtering on glass or another material of a supporting cylinder to achieve the desired UV-reflecting properties. The face of the PCB exposed to the UV-radiation can be sputtered with PTFE or alternatively clad with the sheet of expanded PTFE foil to maximize the reflection and utilization of the UV-energy produced by the LED(s).

FIG. 3 shows a third basic embodiment of a purification reactor of the invention. This reactor differs from that of the other two embodiments in that the UV-light sources 7B are not integrated into the end caps 2C but into the main cylinder tube 1B. The end caps 2C consequently can be of a structure as shown in the right side of FIG. 1 and the structural details described above in this connection can be applied. This includes the forming of portions of the end cap as a reflector, parabolic or circular or combinations thereof, and with a UV-reflecting material for directing the light rate towards the interior volume of the main cylinder tube as shown in FIG. 3. The fittings serving as the ports 3A, 3B communicating with the interior volume 4 of the main cylinder tube 1B can be attached to the end caps 2C as shown and described above but can also be attached to the outer peripheral wall of the main cylinder tube as shown in FIG. 2.

The LEDs 9A serving as the UV-light source 7B in this embodiment are provided in the form of one or more arrays 9 that are mounted on a supporting strip 15 and extend along the length direction of the main cylinder tube 1B. The main cylinder tube in this case includes a cylindrical shell 11 made of UV-reflective material and is provided with a number of recesses or openings 10 that match the positions of the LEDs 9A on the array(s) 9 (see FIG. 4a showing a cross sectional view and a perspective view of the cylindrical shell). Accordingly, the arrays in the form of the strips can be removably attached to the cylindrical shell by screws, for example, as shown in FIGS. 3 and 4c so that the light emitting parts of the LEDs are located in the openings of the shell. To shield the LEDs from the fluid to be processed a cylindrical tube 9 made from UV-transparent material, preferably quartz or silica glass, is inserted into the cylindrical shell and sealed with respect to the fluid as described above, i.e. to the cylindrical shell or to the end caps. An additional supporting cylinder tube can be provided if needed. Otherwise, the combination of cylindrical shell made of UV-reflecting material including PTFE, aluminium or stainless steel, and UV-transparent material cylinder can provide sufficient strength for the reactor to be self-supporting.

The necessary control circuitry and LEDs emitting light in a visible range and connectors are either integrated on the supports of the LED arrays or provided on a separate element attached to the reactor.

Since, in the third embodiment, the LEDs are attached to the outer peripheral side of the UV-reflecting cylindrical shell, the heat will be normally effectively dissipated to the environment without being conducted to the fluid to be processed. Heat radiating features can be additionally provided on the supporting strips of the LED arrays and/or the shell if needed. One example for increasing the heat dissipation is the addition of forced air convection by a fan that could be implemented in one of the end caps (not shown). The air flow created by this fan could be channeled and directed through a space created between the outer periphery of the cylindrical shell with the LED-array(s) and a further peripheral housing, i.e. an outer cylinder.

In a further preferred modification of the embodiments described before an additional third port 3C communicating with the interior volume 4 of the main cylinder tube 1A between the at least two ports 3A, 3B in the vicinity of the respective axial ends of the cylinder tube 1A can be provided as schematically shown in FIG. 5. With the third or central port 3C communicating with the interior volume of the main cylinder provided in addition to the at least two other ports in the vicinity of the axial ends, the biocidal purification reactor of the invention can be used as an UV-barrier module in a laboratory or industrial flow configuration. The modification can be applied to all three basic embodiments and is essentially independent from the way the UV-light source is provided in the reactor. However, there are certain functional advantages when the "dual end-cap reactor" type is used. FIGS. 6a-c show various examples of integration of such UV-barrier module in accordance with the present invention into typical laboratory circuitry.

In the example shown in FIGS. 6a-c the UV-barrier module can be used in a RO/EDI (Reverse osmosis/Electrodeionization) stage downstream of an RO membrane module connected to the central port whereas the axial ports are connected to a downstream EDI module and a drain, respectively. In these figures "DI module" stands for "Deionization module" and it can be made with ion exchange materials (beads, textile, polymers etc.) that retain ions. It is usually a consumable. This arrangement provides insulation between RO permeate and the next or downstream water treatment step, for example in the EDI module. In this configuration the central port of the UV-barrier module can be used to protect the permeate against retro-contamination from the drain. Reverse osmosis is a purification technology that uses a semipermeable membrane. The typical water quality conductivity is above 20 uS/cm when fed by tap water. In the normal way of operation, the purified water flows from the RO module to the EDI module. When stabilizing the optimal performances of the RO module, there is a mode called "RO rinse" in which the produced water is led to the drain. The desired flow patterns can be set by the valves in the circuitry. Thanks to the UV barrier in this arrangement the remaining and resident water in the drain tubing cannot retro-contaminate the permeate stage of the RO module. If the UV-barrier module is used downstream of the EDI module, it can provide insulation between the EDI module and a water storage reservoir. The additional central port of the UV-barrier module can be used to recirculate the water from the reservoir to maintain a low bacterial level (FIG. 6b). If the UV-barrier module is used in a water distribution circuit or polishing stage (FIGS. 6b and c), it can provide insulation between the distribution circuit and the water storage reservoir.

In such application the emission intensity of the UV-light source(s) of the module can be controlled according to the energy needed in the respective system process. A low energy level of the radiation may be chosen when the water is not produced no recirculated or dispensed to avoid heating of the water, to save energy and to increase the lifetime of the UV-light source. A high energy level radiation may be chosen during production and distribution and monitored and controlled according to the water flow rate. The biocidal purification reactor of the present invention provides advantages in that handling, manufacturing, repair and disposal of the reactor is not subject to the strict requirements and safety regulations as existing reactors having mercury based UV-light sources. The power consumption of the UV-light sources in the form of LEDs is considerably lower as compared to mercury based systems. The modular design comprising the main cylinder tube and the end caps containing the UV-light source allows design and adaption of the reactor size to the desired water flow rates and processing volumes in that the main cylinder tube is exchanged against one having a larger axial length. The use of the UV-reflecting material in the main cylinder tube and the end caps makes the entire design more robust and effective even if UV-transparent material in the form of windows or tubes is additionally used. Lastly, the heat produced by the LEDs in the end caps or the main cylinder tube is efficiently dissipated to the environment, directly through the PCB including a metal base and/or through the ring segments with increased surface area used in the end caps. This extends the life of the LEDs and reduces microorganism re-formation in the fluid processed in the reactor.

While three distinct embodiments have been described it goes without saying that the end caps including the UV-light sources can also be used in connection with the main cylinder tube containing an UV-light source in order to maximise UV-radiation input into the interior volume of the main cylinder tube.

The invention claimed is:

1. A biocidal purification reactor, including
a main cylinder tube having opposite axial ends and an interior volume;
at least one end cap closing an opening at least one said axial end of the main cylinder tube;
at least two ports communicating with the interior volume of the main cylinder tube in the vicinity of the respective axial ends of the cylinder tube;
wherein said at least one end cap includes a UV-light source,
wherein said UV-light source is thermally connected to a heat sink adapted to dissipate heat from the UV-light source to the environment, and
wherein the heat sink is in the form of a ring segment with surface area increasing features provided at the end cap.

2. The biocidal purification reactor according to claim 1, wherein the reactor includes a pair of end caps respectively closing openings at said opposite axial ends of the main cylinder tube.

3. The purification reactor according to claim 1, wherein the UV-light source is separated from the interior volume of the main cylinder tube by an UV-transparent material.

4. The purification reactor according to claim 3, wherein the ring segment is arranged in the end cap on a side of the UV-transparent material facing away from the interior volume of the main cylinder tube.

5. The purification reactor according to claim 3, wherein said UV-transparent material is made from quartz or silica glass.

6. The purification reactor according to claim 1, wherein the end cap(s) is/are at least partially made from a material that reflects UV-rays.

7. The purification reactor according to claim 6, wherein said material that reflects NV-rays is aluminum or PTFE or stainless steel.

8. The purification reactor according to claim 6, wherein said end cap(s) is/are at least partially made from a material that reflects UV-rays at portions exposed to the light radiation from the UV-light source.

9. The purification reactor according to claim 1, wherein a portion of the end cap(s) is formed as a reflector for directing the light rays emitted from the UV-light source towards the interior volume of the main cylinder tube.

10. The purification reactor according to claim 9, wherein said reflector is parabolic or circular or combinations thereof.

11. The purification reactor according to claim 1, wherein the UV-light source is a UV-C-light source including at least one LED adapted to emit light in the UV-C wavelength range of 220 nm-300 nm.

12. The purification reactor according to claim 11, wherein the main cylinder tube includes a UV-light source, and wherein a plurality of LEDs are provided in one or more arrays that is/are arranged along the length of the main cylinder tube.

13. The purification reactor according to claim 12, wherein the one or more arrays of LEDs are located in corresponding openings or recesses of a cylindrical shell made of UV-reflective material that forms an element of the main cylinder tube.

14. The purification reactor according to claim 13, wherein a cylinder made from an UV-transparent material is arranged between the cylindrical shell and the interior volume of the main cylinder tube.

15. The purification reactor according to claim 14, wherein said cylinder is made from quartz or silica glass.

16. The purification reactor according to claim 11, wherein said LED light source is adapted to emit light in the UV-C wavelength range of 260 nm+/−5 nm.

17. The purification reactor according to claim 11, wherein the LED(s) is/are mounted on a PCB including a metal base.

18. The purification reactor according to claim 1, wherein said main cylindrical tube has inner peripheral surfaces, and wherein at least part of the inner peripheral surfaces of the main cylinder tube are formed with a UV-reflecting material.

19. The purification reactor according to claim 18, wherein the UV-reflecting material is provided as a lining or sheet overlaying the respective surface of a supporting tube body.

20. The purification reactor according to claim 18, wherein said at least part of the inner peripheral surfaces of the main cylinder tube are formed with a UV-material that is PTFE or aluminum or stainless steel.

21. The purification reactor according to claim 18, wherein the UV-reflecting material is provided as a coating applied on the respective surface of a supporting tube body.

22. The purification reactor according to claim 18, wherein the supporting tube body is made from the solid UV-reflecting material.

23. The purification reactor according to claim 1, wherein said main cylindrical tube has inner peripheral surfaces, and wherein at least the parts of the inner peripheral surfaces of main cylinder tube that in operation come in contact with a medium to be processed in the reactor are covered by a UV-transparent separation layer.

24. The purification reactor according to claim 23, wherein said UV-transparent separation layer is quartz or silica glass.

25. The purification reactor according to claim 1, comprising a third port communicating with the interior volume of the main cylinder tube between the at least two ports in the vicinity of the respective axial ends of the cylinder tube.

* * * * *